Sept. 23, 1930.  W. C. KEYS ET AL  1,776,510
AUTOMOBILE FLOOR
Filed Dec. 28, 1928
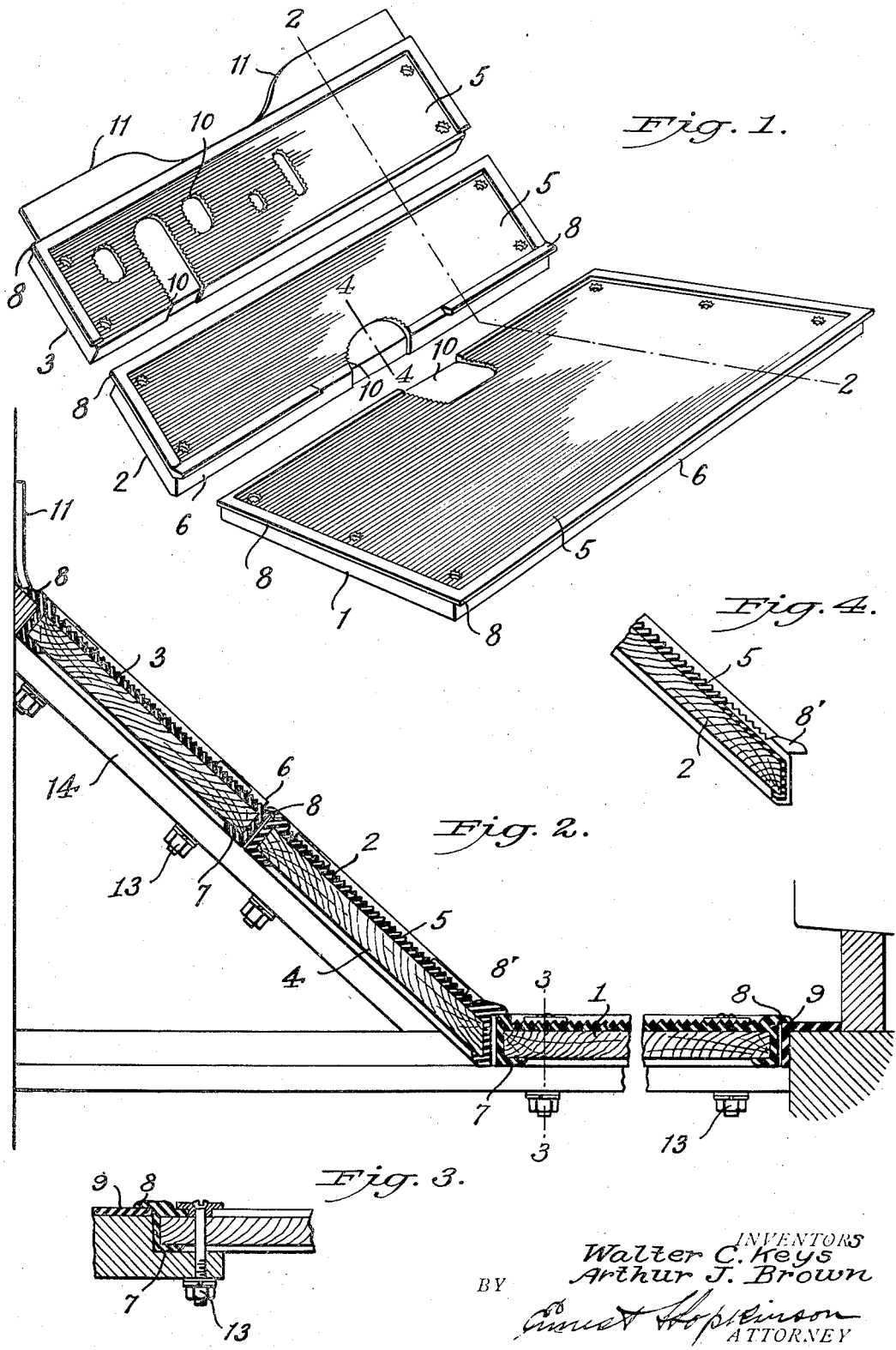
INVENTORS
Walter C. Keys
Arthur J. Brown
BY
Ernest Hopkinson
ATTORNEY Patented Sept. 23, 1930

1,776,510

UNITED STATES PATENT OFFICE

WALTER C. KEYS, OF DETROIT, MICHIGAN, AND ARTHUR J. BROWN, OF LAKEWOOD, OHIO, ASSIGNORS TO THE MECHANICAL RUBBER COMPANY, OF CLEVELAND, OHIO, A CORPORATION OF NEW JERSEY

AUTOMOBILE FLOOR

Application filed December 28, 1928. Serial No. 328,893.

This invention relates to a new and improved flooring, more particularly flooring adapted for use in automobiles.

In the usual construction of automobile floors a number of wood boards cut to proper shape and provided with apertures adapted to accommodate the operating mechanism of the automobile for the driver's compartment are fastened to the frame of the car with the edges of the boards in proximity so as to provide a substantially complete floor for the automobile. It has been customary to cover this wooden floor with a suitable protective material usually of a type which will not be destroyed, discolored or otherwise marred by use or by the action of corrosive agents and which may be readily cleaned or washed so as to regain its original appearance. A satisfactory material for this purpose is vulcanized rubber and floor mats made of vulcanized rubber have been used very commonly. These floor mats of vulcanized rubber are usually made in one-piece having the shape of the floor of the operator compartment and being provided with various apertures adapted to accommodate the operating mechanism of the car. These vulcanized rubber mats are usually laid in position on the floor of the car and are often not secured in any manner although in some instances some means of securing the mat such as snap buttons have been employed, but not with completely satisfactory results.

The types of floor construction at present in use in automobiles have a number of objectionable features. In order to clean the floor of the operator compartment it has been necessary to remove the floor mat and clean it and the wood floor separately. Due to the construction of the operating mechanism of an automobile it is usually difficult to extract the floor mat from the car and, due to the lack of mechanical strength of most of the floor mats now in use, such removal of the floor mat is frequently accompanied by the tearing of the mat which mars its appearance and shortens its life. Another objectionable feature of the present type of automobile floor is that the mat, especially in the type where no securing means for the mat is used, often works about the operating pedals of the automobile in such a manner as to interfere with the proper operation thereof. Inasmuch as the usual floor board is made of wood, there is a tendency of such a floor to squeak due to the twisting or wearing of the automobile while in operation, even though the boards may be tightly secured to the frame. This squeaking comes from the rubbing of the wood surfaces at their points of contact. Furthermore, the securing means for the floor boards often work loose with the result that the wood floor boards rattle in contact with the frame of the automobile and with each other. Inasmuch as it is impossible in practice to fit the floor boards together perfectly, cracks, sometimes of considerable size, often occur between the boards and betweeen the boards and the automobile body which permit an inflow of air therethrough which carries dust and dirt into the interior of the car and tends to create drafts. Another objection to the present type of construction of floor board is that there are two assembly operations involved in applying the same inasmuch as the boards must be laid first and the mat laid thereover and this double assembly operation is expensive in present day automobile manufacturing processes where several hundred automobiles a day, and often more, usually are built.

It is the object of the invention to provide a new automobile floor construction in which it is unnecessary to wash the surface material and the floor boards separately, in which the removal of the floor boards is ordinarily unnecessary but when necessary is not attended with the troublesome task of removing a floor mat first, in which the covering material for the floor members cannot work about the operating pedals or interfere with the operation of the same. It is also the object of our invention to provide an automobile floor in which the possibility of squeak due to the rubbing of adjacent parts of floor boards is eliminated and in which the danger of rattling due to loosened floor boards is eliminated and drafts and dirt are more perfectly excluded. It is also the object of the invention to provide a floor board which may be assembled in one operation and which is unitary in construction eliminating parts, such as aluminum beadings and the like.

Without intending to limit more than is required by the prior art and with the embodiment disclosed in mind, the invention, broadly stated, consists in a number of units, each unit being made up of a substantially rigid member covered with rubber which preferably is vulcanized in contact with the member. The units are constructed so as to interfit and form a complete floor and the units are provided as required with apertures to accommodate the operating mechanism (pedals, levers, etc.) of the automobile. The units preferably have rubber along the edges thereof which eliminates the possibility of squeaking due to the rubbing of the boards together and also have rubber on the bottom side thereof so that if any of the units should work loose while the automobile is in operation, any rattling will be prevented by the rubber which serves as a sound-deadening material.

One embodiment of our invention is described in detail in the following specification and shown in the accompanying drawing in which:

Fig. 1 is a perspective view of several units of an automobile floor suitable for the driver's compartment.

Fig. 2 is a section taken on line 2—2 of Fig. 1.

Fig. 3 is a section taken on line 3—3 of Fig. 2.

Fig. 4 is a sectional view on the line 4—4 showing a detail of the construction of the automobile floor.

The flooring of this invention may be made in various shapes and sizes to meet the requirements of the job. In the drawings illustrating one embodiment of the invention, it is shown composed of units 1, 2 and 3 each comprising a base 4 of substantially rigid or strain resisting material, such as wood, and a surfacing coat 5 of any suitable thickness, about as shown, and preferably of vulcanizable rubber composition because of its adaptability to molding with an attractive anti-slipping surface and either plain or vari-colored in appearance. The rubber composition covers the top or wearing side of the board 4, the sides and ends of the boards as indicated at 6, and preferably, but not necessarily, also the margins of the bottom side of the boards as indicated at 7. Flanges 8 and 9 of rubber composition are formed integral with the body of the rubber composition to cover the cracks between the boards, and also between the boards and the frame into which they are adapted to be fitted.

The boards 4 may be provided with apertures for the various operating parts of the car (foot pedals, starter, gear shift lever, etc.) in which event the spaces so formed are preferably temporarily filled with metal or other blocking material to exclude the rubber therefrom, or the boards 4 may be imperforate in which event, and if desired, the molds in which the units are vulcanized may be suitably shaped to mark the spaces for subsequent aperturing to receive the various operating parts of the car in the driver's compartment.

Flexible elongated flanges 11 may be provided where convenient as for instance at the front of the unit 3, to protect against wear as well as improve the appearance and close any gap that may be at such locations. The unit 2 meeting the unit 1 at an angle requires that the flange 8' be vulcanized in the mold so as to normally lie flat against the horizontal unit 1.

In manufacturing flooring according to this invention, the rigid and strain resisting base members 4, which are preferably of wood, are first sheathed with about the right quantity of coating material, vulcanizable rubber composition being preferred, to properly fill out the mold when the material is vulcanized or set. The molds are, of course, machined to the desired finished shape of the units. With the member 4 and composition 5 assembled in the mold, it is closed and held under pressure while subjected to an elevated temperature suitable for curing or setting the particular composition employed. If the base members or boards 4 have been previously apertured, and the spaces filled with blocks of metal or other blocking material, these of course, after the vulcanization of the assemblage, are removed. The units are thus formed with their strain resisting and substantially rigid base members of wood sheathed with rubber composition which has been vulcanized or set in direct contact therewith and thereby secured tenaciously in situ and with substantially no waste. The finished units may be removed from the vulcanizing mold with facility and are ready for delivery to the automobile manufacturer.

Units 1, 2 and 3 are assembled in position as shown in Fig. 2 and are held to the frame of the car by a securing means such as bolts and nuts 15, suitable washers being provided thereon. As shown in Fig. 2 when the units are in assembled position the rubber on the edges thereof are brought into contact with each other and with the frame of the car and the rubber along the margin of the lower side of the units rests upon the frame 14 of the automobile.

The units of our floor are made from a suitable rigid member which preferably is wood (solid or plied) although other materials for instance such artificial woods as compressed vegetable fibre may be employed. These boards are covered with a composition which preferably is soft rubber although the sulphur and filler content of the rubber may be varied within a wide range. The rubber may be applied to the boards in the form of a sheet or otherwise as convenient. The apertures for the operating mechanism of the automobile and for the fastening means may be cut in the units, in the usual manner, after the molding and vulcanizing operations are completed. However, if desired, the openings in the board may be cut prior to the application of the rubber.

It will be observed from the description of the invention above set forth that an automobile floor is provided which accomplishes the objects above set forth. The necessity of removing the floor covering in the form of a mat prior to cleaning the automobile floor or prior to removing one of the floor boards in order to gain access to the mechanism of the car has been eliminated, for with a floor of this construction it is necessary only to wash or clean the surface of the rubber inasmuch as débris cannot accumuulate beneath the rubber covering. With this construction of floor the danger of tearing the rubber cover by removal of the same has been eliminated as well as the danger of having loose parts of a floor mat which interfere with the operation of foot pedals. Also due to the rubber which extends along the edges of the units as well as along the margin of the under side of the units all danger of squeaking due to the rubbing of wood upon wood has been eliminated and all danger of rattling of wood upon wood has also been eliminated due to the fact that a rubber surface is presented at all points of contact between the units inter se and between the units and the frame of the automobile or body parts for supporting the floor. In addition the assembly operation of our floor is a simplified one inasmuch as it is only necessary to position the units in proper place in order to assemble the floor of our invention, the extra step of applying the rubber mat thereover being eliminated with a consequent reduction in the cost of assembling.

The tongues of rubber which cover the cracks between the units and between the units and the adjacent parts of the automobile body serve to prevent the inflow of air through such cracks and thereby prevent ingress of dust, water, and dirt through the floor and prevent drafts through the floor in the operator compartment.

For an understanding of the scope of our invention reference should be made to the following claims.

Having thus described our invention, what we claim and desire to protect by Letters Patent is:

1. The combination with a vehicle frame comprising supporting elements for a floor board subjected to strains and vibrations, of a readily removable floor board conforming to the shape of the co-operating supporting frame elements, composed of a plurality of units shaped to interfit at their juxtaposed edges and to fit the vehicle, each unit consisting of a rigid member having a layer of vulcanized rubber composition bonded thereto, said layer covering the wear surface of the member, its edges and the margins of the surface which rest upon the frame of the vehicle so as to provide a cushion of rubber composition between the juxtaposed edges of the members and between the members and the frame of the vehicle.

2. The combination with a vehicle frame comprising supporting elements for a floor board subjected to strains and vibrations, of a readily removable floor board conforming to the shape of the co-operating supporting frame elements, composed of a plurality of units shaped to interfit at their juxtaposed edges and to fit the vehicle, each unit consisting of a rigid member having a layer of vulcanized rubber composition bonded thereto, said layer covering the wear surface of the member, its edges and the margins of the surface which rest upon the frame of the vehicle so as to provide a cushion of rubber composition between the juxtaposed edges of the members and between the members and the frame of the vehicle, and a flange of rubber composition carried thereon and extending over a contiguous part.

Signed at Detroit, county of Wayne, State of Michigan, this 17th day of December, 1928.

WALTER C. KEYS.

Signed at Cleveland, county of Cuyahoga, State of Ohio, this 20th day of December, 1928.

ARTHUR J. BROWN.